(12) United States Patent
Harde

(10) Patent No.: US 7,033,478 B2
(45) Date of Patent: Apr. 25, 2006

(54) ION SEPARATION AND REMOVAL UNIT WITH GAS EXTRACTION

(75) Inventor: Nils Yngve Harde, Malmo (SE)

(73) Assignee: Christina Harde, Virum (DK)

( * ) Notice: Subject to any disclaimer, the term of this patent is extended or adjusted under 35 U.S.C. 154(b) by 428 days.

(21) Appl. No.: 10/648,011

(22) Filed: Aug. 26, 2003

(65) Prior Publication Data

US 2004/0050691 A1 Mar. 18, 2004

(30) Foreign Application Priority Data

Sep. 10, 2002 (SE) .................................. 0202683

(51) Int. Cl.
*C02F 1/48* (2006.01)
*H02K 44/14* (2006.01)

(52) U.S. Cl. ................... 204/664; 204/275.1; 204/278; 204/557; 210/222; 422/186.01

(58) Field of Classification Search ............. 204/275.1, 204/278, 557, 664; 210/222, 695; 422/186.01
See application file for complete search history.

(56) References Cited

U.S. PATENT DOCUMENTS

| | | | |
|---|---|---|---|
| 3,352,422 A | | 11/1967 | Heden |
| 3,567,031 A | | 3/1971 | Loeffler |
| 3,719,583 A | | 3/1973 | Ustick |
| 4,127,453 A | * | 11/1978 | Radebold .................. 205/339 |
| 5,238,558 A | * | 8/1993 | Curtis ....................... 204/664 |

(Continued)

FOREIGN PATENT DOCUMENTS

| | | | |
|---|---|---|---|
| JP | 59-69190 | * | 4/1984 |
| SU | 732014 | * | 5/1980 |

OTHER PUBLICATIONS

John A. Dean, editor, Lange's Handbook of Chemistry, twelfth edition, McGraw-Hill Book Company, New York, 1979, pp. 6-8.*

*Primary Examiner*—Roy King
*Assistant Examiner*—W. T. Leader
(74) *Attorney, Agent, or Firm*—Ladas & Parry LLP

(57) ABSTRACT

This invention is applied to any ionized solution of dissolved solids and electrolytes, such as sea water, which is forced through a conduit equipped with a magnetic wall of rectangular cross-section, which induces a magnetic field, where ions separate when passing through according to magnetohydrodynamic physics. The conduit is made up of one continuous magnetic wall, a spiral or similar, with opposite magnetic poles on each side, where these both sides co-operate to extend magnetic fields with parallell wall in the same direction through the whole conduit. The ionized solution is pumped into the center of the spiral and further out through the spiral or similar. The charged ions in the flow stream are deflected laterally towards the open ends and as separated positive or negative ions into chambers outside the conduit. The ions concentrating in each chamber influence an electric tension acting similar to a capacitor, which counteracts the magnetic field movement of the ions but is released by short-circuiting the electrodes placed in each chamber to discharge the ions thus inducing a useful current. With the discharge of ions gases are produced and trapped in cylindrical collectors. The spiral outlet is divided into cells to control and to adjust the degree of de-ionization. An additional power source connected in series with the electric circuit increases the rate of de-ionization and speeds up ion discharge and gas output. The effluents have a controlled speed outflow from both chambers into drainpipes.

6 Claims, 1 Drawing Sheet

U.S. PATENT DOCUMENTS 5,369,992 A * 12/1994 Meng ........................ 73/148
6,029,453 A *  2/2000 Mendive ................... 60/641.2
6,180,012 B1    1/2001 Rongved
6,310,406 B1 * 10/2001 Van Berkel ................. 290/43
2004/0007452 A1 *  1/2004 Warren et al. ............. 204/155

* cited by examiner

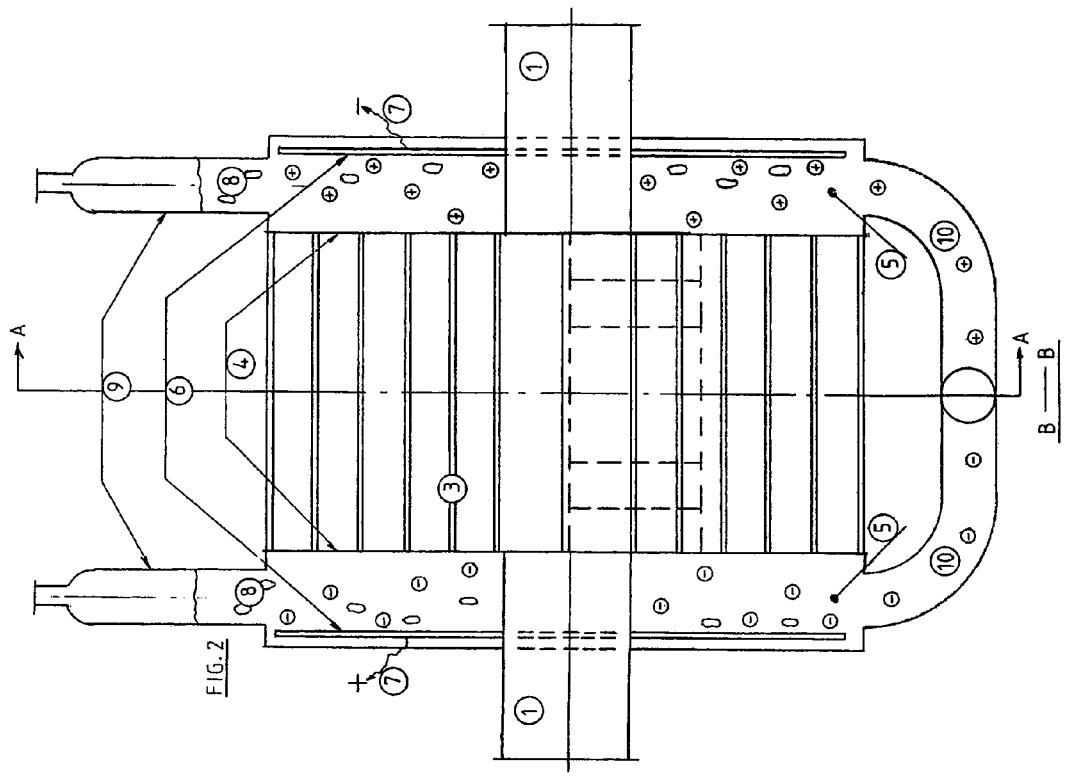
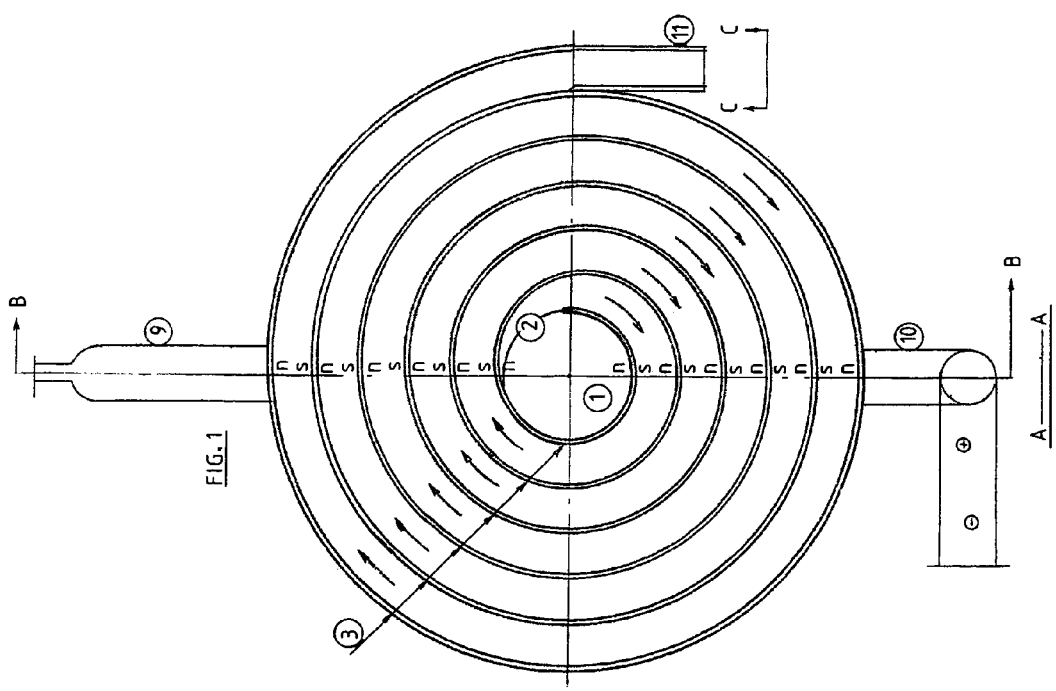

ION SEPARATION AND REMOVAL UNIT WITH GAS EXTRACTION

BACKGROUND

The present invention is related to one of the most important challenges to mankind today—obtaining potable as well as distilled water from the sea. Although the invention can be applied to other commercial fields for the de-ionization of solutions and the extraction of ions to produce valuable gases, the primary goal is desalination of sea water. The world's number one user of water is agriculture for irrigation, which together with industry accounts for between 80 and 90% of world consumption. Sea water contains dissolved salts, mainly ions of sodium ($Na^+$) and chlorine ($Cl^-$), and is not useful. Some Middle Eastern countries, especially Saudi Arabia, have resources through their oil wealth but no water. Improved living standards and rapid increase in population require building of new desalination plants at huge costs. These desalination plants are powered by abundant sources of fossil fuels, oil and natural gas. The sea water is boiled and the steam is cooled to produce distilled water, processes needing a lot of energy and causing our biggest environmental pollution problem of today from toxic exhaust gases. A considerable problem in boiling water in existing desalination plants is scaling, causing plants to be closed down for costly cleaning and repair. The second most common method of desalination in the world is the reverse osmosis process, using high-pressure water against membranes, which do not allow ions of sodium or chlorine to pass through. Both these desalination methods have an efficiency of about 40% and the brine outlet has double its sodium and chlorine ion content compared to the present invention using electro- or permanent magnets in the walls of a spiral or similar conduit, which has economic advantages and is efficient by the discharge and elimination of ions to gas. The magnetic field forces the ions, to move laterally to the conduit's ends, to discharge at electrodes in the outside chambers of the spiral conduit by short-circuit, inducing a current that can be used. The only energy needed is that required to pump sea water into the spiral unit using permanent magnets with already built-in energy. Adding a power source in series with the electric circuit speeds up the de-ionization process which pays for itself in the production of hydrogen and chlorine gases for commercial purposes. No running costs, no environmental problems.

SUMMARY OF THE INVENTION

Advantages obtained are in accordance with the present invention of de-ionizing solutions of electrolytes and ionized dissolved solids, when passing through a magnetic field in a conduit based on magneto-hydrodynamic physics and ion removal by discharge with gas extraction.

The following features are based on a spiral conduit unit for sea water desalination. The first feature is a conduit of rectangular cross-section made as a spiral giving one continuous wall between two flow sections with the inlet in the center. The second feature is the spiral wall of the conduit consisting of magnets along its full length with magnetic North polarity on one side and South on the other side of the wall, generating double action to influence magnetic fields in adjacent flow sections. The third feature is the magnetic field in the spiral conduit having the same direction through the whole conduit, through which the liquid stream must flow causing a continuous force on oppositely charged ions to move laterally and perpendicular to the flow stream and the magnetic field out to the open ends. The fourth feature is a chamber at each end of the spiral conduit, where ions of opposite charges are concentrating.

The fifth feature is the short circuit of electrodes to break-up a counteraction of an electric tension arising from oppositely charged ions in the chambers, similar to a capacitor, acting against the movement of ions influenced by the magnetic field. The sixth feature is also at the short-circuit of electrodes, which induces a useful current at the discharge of ions, which generates gases of hydrogen and chlorine. The seventh feature: by connecting an additional power source in series with the existing electric circuit, the de-ionizing efficiency and the production of commercially interesting gases is increased.

The eight feature is the outlet of the spiral conduit being divided into cells to control the retention of some salts to be able to offer potable water, as well as distilled water. The ninth feature is the interesting effluents with a controlled speed outflow from the chambers, where the chlorine chamber effluent has a low ion concentration and can be returned to the sea water intake for repeated de-ionization, while the hydrogen chamber effluent provides an alkaline solution of sodium hydroxide which, by evaporation, produces a strong solution of caustic soda, $NaOH$.

Both effluents can of course be directed into one outlet.

The tenth feature is the energy needed which, in the invention using permanent magnets with built-in energy, the only energy required is to pump the solution into the inlet(s) compared to other processes, where further treatment is required.

Ion Separation and Removal Unit with Gas Extraction

BRIEF DESCRIPTION OF DRAWINGS

Certain elements of the invention are shown in the drawings.

FIG. 1 shows a sectional view A—A through the spiral conduit with arrows showing the direction of the flow stream through the magnetic field having the same direction in the spiral extending between the positive magnetic North (n) on one side of the wall to the negative South (s) on the opposite side of the wall.

FIG. 2 shows a schematic cross-section B—B through the spiral and enclosed chambers with electrodes and charged ions; bubbles from the ion discharge to the gas collectors and outlets of the drain solution. Inlets into the spiral from two intakes if necessary.

FIG. 3 shows the view C—C of the outlet of the spiral conduit divided into cells.

DETAILED DESCRIPTION OF PREFERRED EMBODIMENTS.

FIG. 1 and FIG. 2 show the inlets (1) into the spiral conduit with the possibility (from two intakes) to supply the liquid to be treated to the center of the conduit; the spiral center with its outlet (2) into the spiral conduit; the spiral conduit wall (3) provided with magnets along its full length having their magnetic North (n) and South (s) poles in two adjacent conduit flow streams; the spiral open ends (4) with chambers (5) outside, where oppositely charged ions are collected; the electrodes (6) in the chambers to discharge ions with electric connections (7) to short-circuit the electrodes; gas bubbles (8) generated by the ion discharge in the electric circuit; collection bottles (9) in which the gases are collected; outlet pipes (10) of drain solution from the chambers; the spiral conduit outlet (11) with cells, FIG. 3; ions shown in circles with positive and negative charge.

DETAILED DESCRIPTION OF THE INVENTION

This invention is best exemplified by desalination of sea water, which contains dissolved sodium chloride, giving about equal parts of sodium ions ($Na^+$) and chlorine ions ($Cl^-$). A rectangular conduit with its parallell sides shaped into a continuous long spiral wall with open ends consists of electro- or permanent magnets along its full length with the positive magnetic North pole on one side and the negative South pole on the other side of the wall. The sea water can be pumped through two inlet tubes into the center of the spiral conduit, forcing the water out in the spiraling conduit through an opening. Between two magnet spiral walls a magnetic field is induced having the same direction through the whole conduit, through which the water stream passes. According to hydro-dynamic physics, this forces oppositely charged ions in the sea water to move in opposite directions to each other laterally and perpendicular to both the magnetic field and the flow out through the ends of the conduit. Oppositely charged ions concentrate in chambers outside the spiral conduit and an electric field arises, acting similarly to a capacitor, which counteracts and neutralizes the magnetic force on the movement of the ions. Through short-circuiting electrodes placed in each chamber the electric field is released and ions discharge and an electric current is achieved, which is a useful power source. Upon the discharge of ions, gases of hydrogen and chlorine are generated, which are collected for further distribution. The only need of energy required is pumping the sea water through the spiral unit using permanent magnets with its built-in energy. It is advantageous to connect an additional power source in series with the electric circuit as this increases the rate of de-ionization of the sea water in the spiral conduit by the discharge of ions and the production of commercial gases.

The effluent from the chambers with a controlled speed outflow contains undischarged ions of sodium and chlorine and a sodium hydroxide solution, which can be used either for repeated de-ionization by addition to the sea water or in an evaporation plant producing a strong alkaline solution of sodium hydroxide, caustic soda (NaOH). The outlet of the spiral conduit of the de-ionized water is divided into cells to allow adjustable control to retain some salts to be able to offer potable drinking water.

What is claimed is:

1. An apparatus for de-ionizing fluid solutions of electrolytes and ionized dissolved solids by separation using magneto-hydrodynamic properties and the removal of ions by discharge with gas extraction, said apparatus comprising:

(a) a convoluted conduit having open ends;
(b) a first inlet extending into the center of the convoluted conduit;
(c) a first continuous wall winding around the center of the convoluted conduit, so that sections of the wall are parallel to adjacent sections of the wall;
(d) electro- or permanent magnets wherein activating magnetic fields on both sides of the continuous wall by magnetic North and South polarity extending in the same direction throughout the whole conduit, thereby affecting the flow stream of the ionized solution when passing through the conduit by forcing positive and negative ions to move continuously in opposite directions to each other in a direction lateral and perpendicular to the fluid flow and the magnetic field and out through the open ends of the conduit,
(e) ion collection chambers disposed on laterally opposed sides outside of the conduit whereby ions separated by positive or negative charge within the conduit are concentrated in one or the other of the chambers depending on their charge;
(f) electrodes disposed inside of said ion collection chambers, which upon producing a short-circuit closes an electric circuit, whereby internal build-up of electric charge caused by the concentrated ions is released, thereby inducing usable current and discharging and removing ions and generating gases as important by-products; and
(g) effluents providing for a controlled speed outflow from both ion collection chambers into drainpipes.

2. The apparatus for de-ionization as in claim 1 wherein permanent magnets are used in the continuous magnetic wall and where the apparatus has no need of an external power input, when the solution is pumped through the conduit.

3. The apparatus for de-ionization as in claim 1 wherein an outlet of the conduit is divided into cells to control and adjust the de-ionized solution to produce predetermined ion concentrations.

4. The apparatus for de-ionization as in claim 1 wherein a power source to increase the discharge of ions and the de-ionization rate is connected in series with the existing electric circuit thereby increasing the speed at the ions flow through the conduit to the end chambers for discharge and removal.

5. The apparatus for de-ionization as in claim 1 wherein the conduit is in the shape of a spiral.

6. The apparatus for de-ionization as in claim 1 wherein the fluid solutions of electrolytes and ionized dissolved solids further comprise sea water and the apparatus provides desalination to produce hydrogen and chlorine gases in each of the respective chambers.

* * * * *